July 5, 1955 E. SCHROTER 2,712,448

MAGNETIC SOUND RECORDERS

Original Filed Feb. 10, 1949 4 Sheets-Sheet 1

Inventor
Edward Schroter

By Fetherstonhaugh & Co.
Attorneys

MAGNETIC SOUND RECORDERS

Original Filed Feb. 10, 1949 4 Sheets-Sheet 2

Inventor
Edward Schroter
By Fetherstonhaugh & Co.
Attorneys

July 5, 1955 E. SCHROTER 2,712,448

MAGNETIC SOUND RECORDERS

Original Filed Feb. 10, 1949 4 Sheets-Sheet 3

Inventor
Edward Schroter
By Fetherstonhaugh & Co.
Attorneys

MAGNETIC SOUND RECORDERS

Original Filed Feb. 10, 1949 4 Sheets-Sheet 4

Inventor
Edward Schroter
By Fetherstonhaugh & Co.
Attorneys

United States Patent Office 2,712,448

Patented July 5, 1955

2,712,448

MAGNETIC SOUND RECORDERS

Edward Schroter, Montreal, Quebec, Canada, assignor, by mesne assignments, to Ralph J. Samuels, Los Angeles, Calif.

Continuation of abandoned application Serial No. 75,553, February 10, 1949. This application October 27, 1953, Serial No. 388,513

18 Claims. (Cl. 274—4)

This invention relates to improvements in magnetic sound recorders of the type which magnetically records sounds usually in the form of voice or music on a recording tape and plays back or reproduces the sounds recorded on the tape. This application is a pure continuation application of my earlier filed application bearing Serial No. 75,553, filed February 10, 1949, allowed March 3, 1953 and abandoned November 3, 1953.

A particular object of this invention is to provide a magnetic sound recorder with a single universal lever on a panel board for controlling the recording and playing back of the recordings on a tape and for actuating the tape feeding and rewinding mechanisms as well as the braking mechanism for the tape feeding and rewinding mechanisms.

Another object is to provide a novel arrangement for maintaining a constant feed of the tape during the recording and playing back phases, the speed of which is synchronized with the sound recording and reproducing.

Another object of this invention is to provide a novel means for cooperatively actuating turntable driving mechanism and braking mechanism as a unit to control the winding and unwinding of the turntables, when the driving mechanism is moved into and out of engagement therewith, for maintaining tension on the tape between the reels.

A still further object of this invention is to provide a novel slip type turntable mechanism for winding the tape at a speed consistent with its feed during the recording and playing back phases.

A further object is to provide means for automatically changing the slip type turntable from recording speed to high speed winding.

A still further object is to provide a cartridge assembly upon which the recording tape is arranged for reeling and unreeling, said cartridge assembly being removably mountable over the turntables.

A still further object is to provide an automatic control mechanism for stopping and starting the tape feed, during recording intermissions, without interrupting the power driving mechanism.

Yet another object is to provide a novel device for lineal measurement of the tape as it is fed from one reel to the other.

The above and other objects of this invention will be more readily understood from the following detailed description taken in connection with the accompanying drawings, in which—

Figures 1, 2, 14, 15:
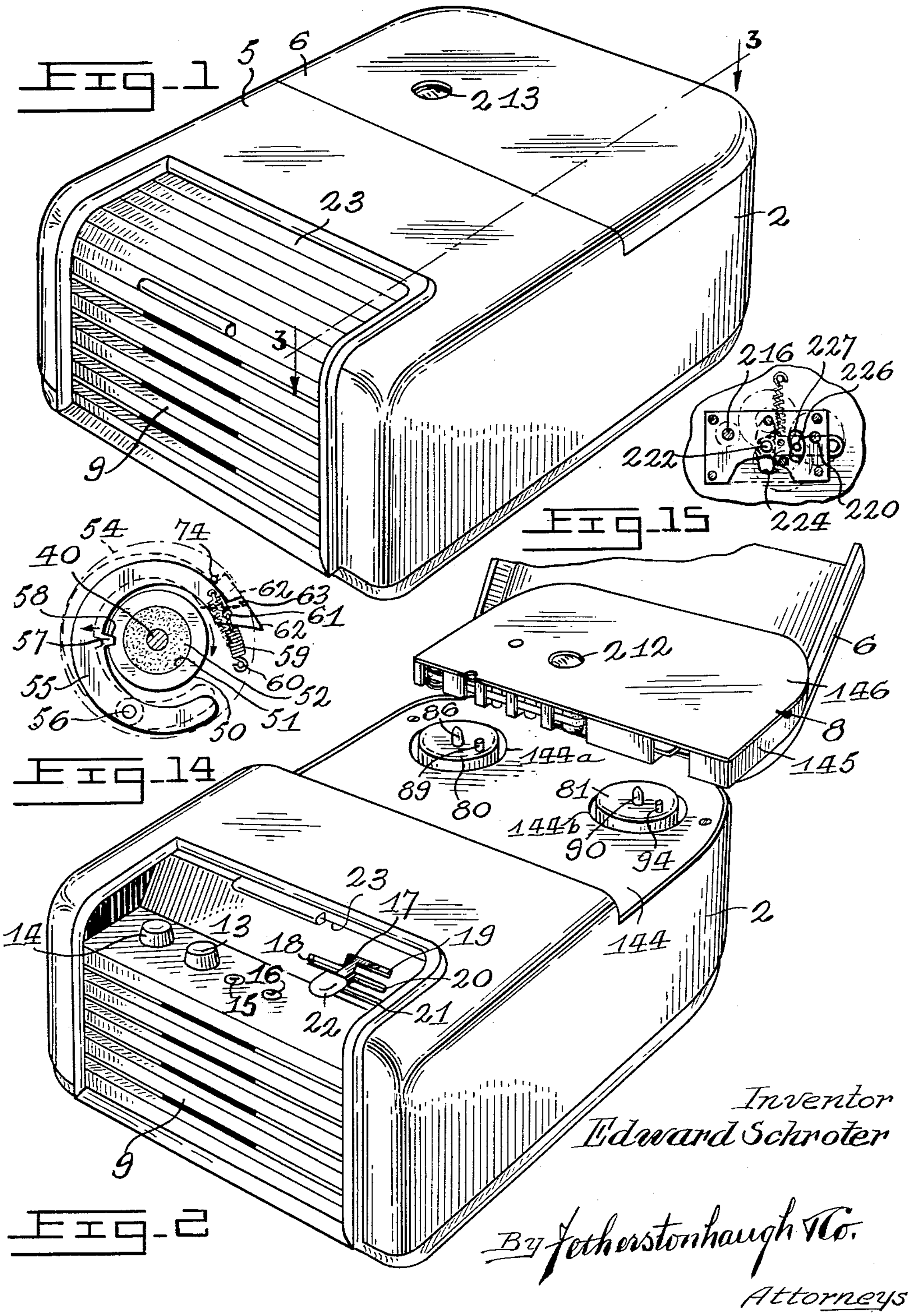
Fig. 1 is a perspective view showing the cabinet of a magnetic sound recorder embodying my invention.
Fig. 2 is a perspective view of the cabinet, showing the panel control board and the cartridge assembly raised above the turntables.
Fig. 14 is a view taken along the lines 14—14 of Fig. 6 but showing the details in full of the capstan clutch member as it would appear mounted about the driving pulley collar. The clutch plate, beneath which the clutch member is arranged, is shown in dash-dot outline.
Fig. 15 is a plan detail view, partly broken away, of the dual rotary mounting of the tape measuring instruments shown in Figs. 5 and 6.

Referring more particularly to the drawings, 2 designates a housing or cabinet for a magnetic sound recorder. A supporting platform or table 3, extending across the cabinet and mounted on posts 4, generally divides the cabinet into upper and lower compartments. The cabinet has a cover divided into front and rear sections 5 and 6. The rear section 6 is hinged to the rear of the cabinet at 7 for ready access to a removable cartridge assembly, generally indicated at 8. The front of the cabinet has a grill 9 behind which is fitted a loud speaker 10, said loud speaker being connected to the recorder electrical equipment, generally indicated at 11, in the lower compartment. The electrical details of the recorder have been omitted for the sake of clarity since these details do not constitute a part of the present invention.

A recessed panel board 12 is arranged in the front of cabinet 2 above loud speaker 10. The panel board carries a switch and tone control knob 13, a volume control knob 14 and input and output sockets 15 and 16 for microphone and earphone attachment respectively. The rearward sloping surface of panel board 12 is provided with a vertical slot 17 communicating with a horizontal slot 18 on one side thereof and with upper, intermediate, and lower horizontal slots 19, 20 and 21 respectively on the other side thereof. A lever arm 22 extends through vertical slot 17 of the sloping panel board and is selectively movable into each of the horizontal slots. The function of the lever arm will be described in detail hereinbelow. A roll top cover 23 fitted in guide rails 24 closes off the recessed panel board when not in use.

Figures 3, 12:
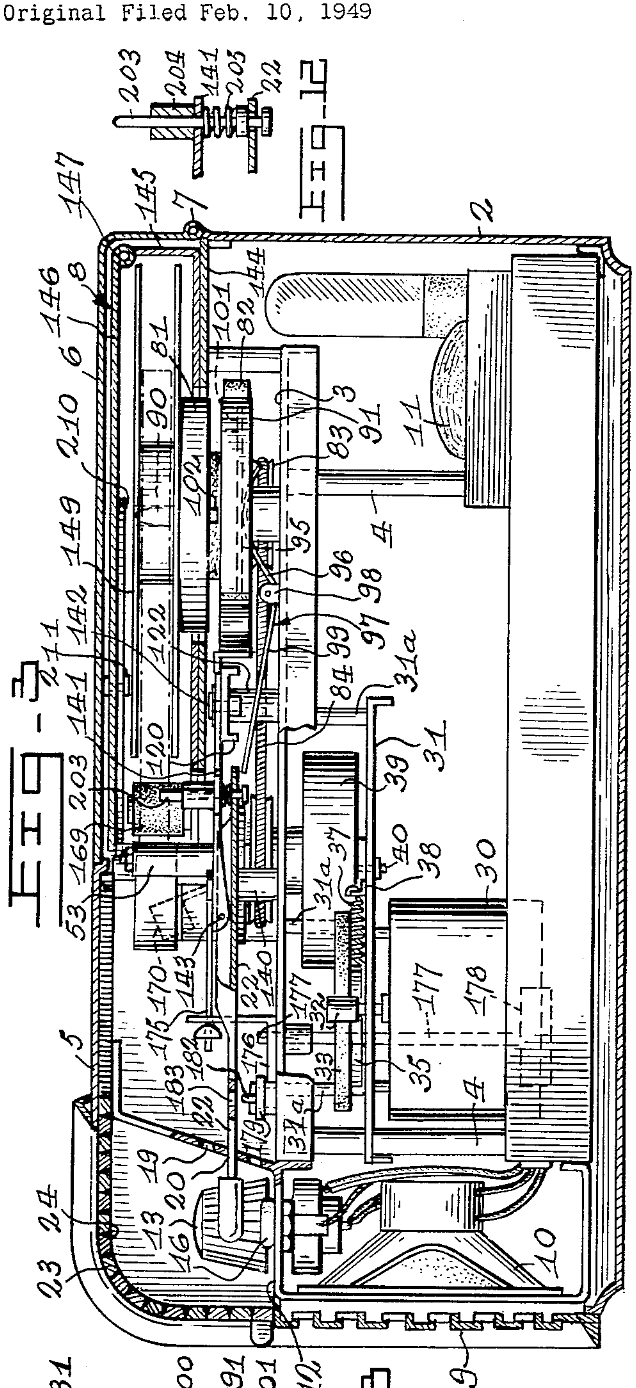
Fig. 3 is a sectional view taken along the lines 3—3 of Fig. 1 and showing the apparatus in side elevation.
Fig. 12 is a detail view of a lever arm actuating post shown in Fig. 3.
Figure 4:
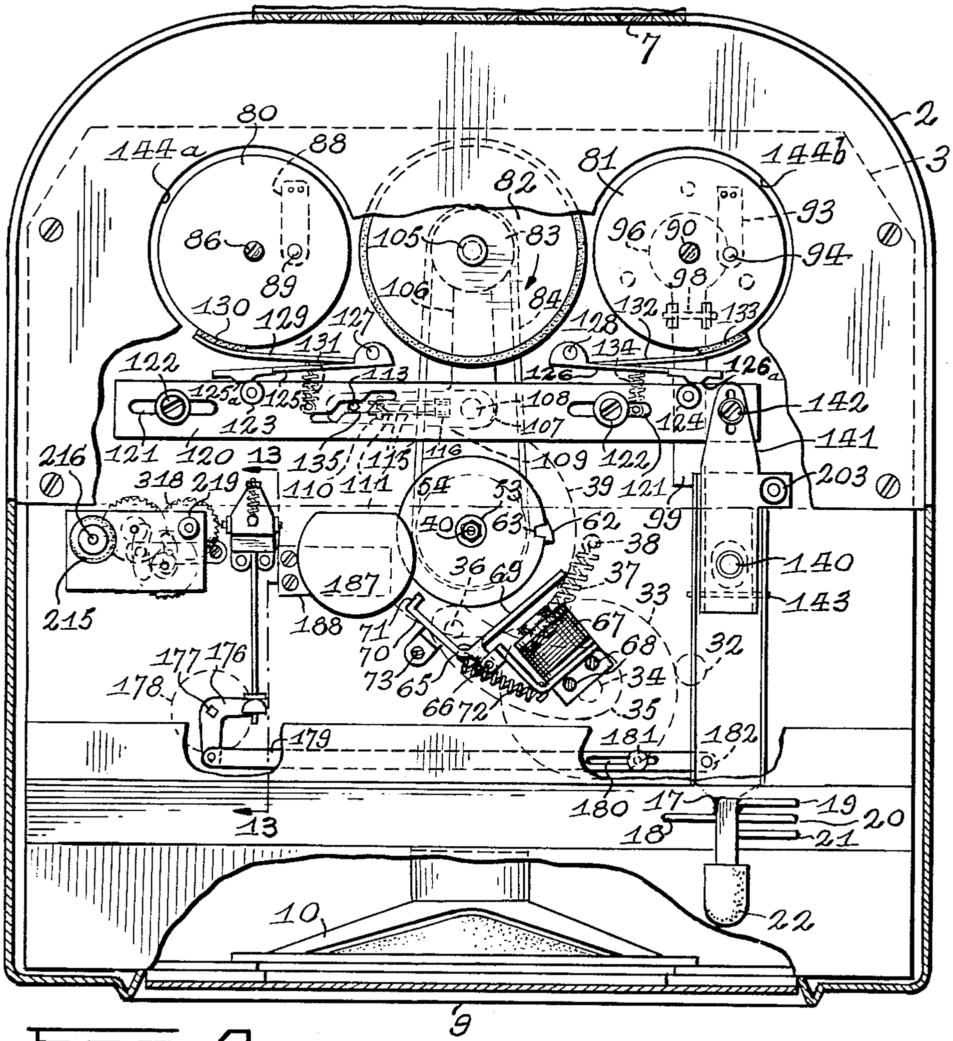
Fig. 4 is a top plan view, partly in section, and with certain parts broken and the cover and cartridge assembly removed for the sake of clarity.
Figure 6:
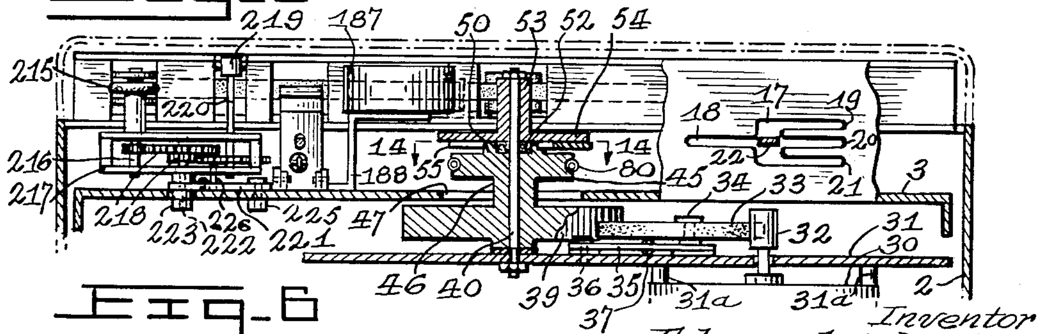
Fig. 6 is a sectional view taken along the lines 6—6 of Fig. 5 but with the details in the lower compartment of the cabinet omitted for clarity.

In Figs. 3, 4 and 6 of the drawings, I have shown a conventional motor 30 suspended from a plate 31 in the lower compartment. The shaft of motor 30 projects through an opening in plate 31 suspended from table 3 by members 31*a*. A small diameter drive wheel 32 is mounted on the motor shaft to rotate therewith above plate 31. A friction idler wheel 33 is rotatably mounted at 34 on a tension arm 35 in a conventional manner, arm 35 is mounted for rotary and sliding movement about pin 36 carried by plate 31. A spring 37 anchored at 38 to plate 31 is fastened to tension arm 35 to cause the friction wheel to bear against drive wheel 32 and a second driving wheel 39 to rotate said second driving wheel in a clockwise direction about a pivotal axis pin 40 carried by plate 31. Driving wheel 39 is of sufficient size and mass to dampen down or tend to eliminate vibrations which might otherwise distort the recordings.

A driving pulley 45 is fixed to rotate with driving wheel 39 about axis pin 40, pulley 45 being integrally connected to driving wheel 39 through a collar 46. Driving wheel 39 is positioned below an opening 47 in the table 3 and pulley 45 is above the table, opening 47 being sufficiently large for the passage of pulley 45 therethrough. Pulley 45 has a collar 50 projecting from its upper surface, said collar being recessed in the central portion, as indicated at 51, for the reception of a friction pad 52 (see Figs. 6 and 14).

Referring particularly to Figs. 4, 6 and 14, a capstan 53, having a clutch plate 54 at the base thereof, is mounted for free rotation about axis pin 40 with the underside of the clutch plate in contact with friction pad 52. A substantially crescent shaped clutch member 55 is pivotally connected at 56 for eccentric rotation adjacent one end of the clutch member to the under side of clutch plate 54 so that, when the capstan is in place, the clutch member will be arranged about collar 50. Clutch member 55 is provided with an inwardly projecting lug 57 which normally engages in a notch 58 in the side edge of collar 50 to cause the capstan to rotate with the pulley 45 and the integrally connected driving wheel 39. A spring 59, fastened at one end 60 to the under side of clutch plate 54 and at its other end to the free end of clutch member 55 remote from the axis pin 56, as indicated at 61, tends to rotate the clutch member about pivotal axis 56 so as to engage the lug 57 in notch 58. The free end of the clutch member 55 is provided with a fingerlike projection 62 which normally projects beyond the outer periphery of clutch plate 54. The clutch plate is notched as indicated at 63 at a point overlying the fingerlike projection 62 when the clutch member is in its normal operative clutch engaging position so that the fingerlike projection 62 normally serves as an obstruction at the entrance of notch 63.

An L-shaped member 65 is pivotally mounted at 66 on one side of a magnet 67 secured to table 3 by screws 68. One arm 69 of member 65 is arranged in front of the magnet head, and the other arm 70, having an inwardly directed pawl 71, is arranged to engage pawl 71 in the notch 63 of the capstan clutch plate 54. A spring 72, anchored at one end to table 3, and fastened at the other end to member 65, normally tends to bias the member 65 to its inoperative position by rotating member 65 about its pivotal axis 66 so that the arm 69 is moved out of contact with the magnet head and the pawl 71 of the other arm 70 is moved out of contact with the clutch plate notch 63. A stop member 73 mounted on table 3 limits the rotation of member 65 by spring 72.

In order to stop rotation of the capstan without interrupting rotation of the motor power driving pulley 45, the magnet is energized to close the gap between arm 69 and the magnet head, rotating member 65 about its pivotal axis against the biasing spring 72. In this manner pawl 71 is brought to bear against the edge of clutch plate 54 until it encounters the fingerlike projection 62 and then rotates the clutch member 55 about its eccentric pivotal axis 56 against the resistance of spring 59 to thereby withdraw the lug 57 from notch 58 in collar 50 to the position shown in dotted lines in Fig. 14. With the eccentric arrangement of clutch member 55, the fingerlike projection 62 gradually recedes beneath clutch plate 54 as member 55 is rotated by pawl 71 until projection 62 is brought up against a stop pin 74 projecting downwardly from the under side of clutch plate 54. The stop pin 74 is positioned to allow rotation of the clutch member 55 to a point where the fingerlike projection 62 no longer obstructs the entrance to notch 63 in the clutch plate. Pawl 71 is thereby permitted to engage in notch 63 holding the clutch plate in the dotted line position, to prevent further rotation of the capstan relative to pulley 45.

When it is desired to start up the capstan, the magnet is de-energized to release arm 69 of member 65 which is rotated to its inoperative position by the biasing spring 72. This action withdraws pawl 71 from notch 63 and from pressure engagement with the fingerlike projection 62 of clutch member 55. Spring 59 then rotates clutch member 55 about its pivotal axis 56 causing lug 57 to be brought into locking engagement with notch 58 of the rotating collar 50.

The motor powered driving mechanism actuates a pair of turntables 80 and 81 through the medium of a friction driving wheel 82 fixed to rotate about a common axis with a pulley 83 which is connected by suitable belt 84 to the driving pulley 45. Turntable 80 is mounted on a drum 85 to rotate therewith. A centering pin 86 carried by table 3 serves as a common axis pin for drum 85 and turntable 80. The free end of pin 86 projects beyond the upper surface of turntable 80 for centering a tape reel thereon. A spring plate 88 is secured to the inner surface of the upper side of turntable 80 and is provided with a locking pin 89 which projects through a hole in the turntable for locking engagement with the reel when mounted on said turntable 80.

Figure 8:
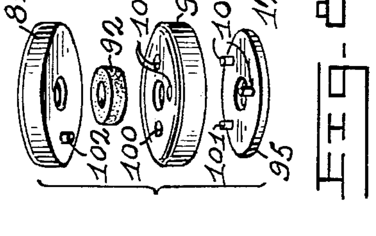
Fig. 8 is an exploded view showing the details of the right hand turntable assembly.
Figure 7:
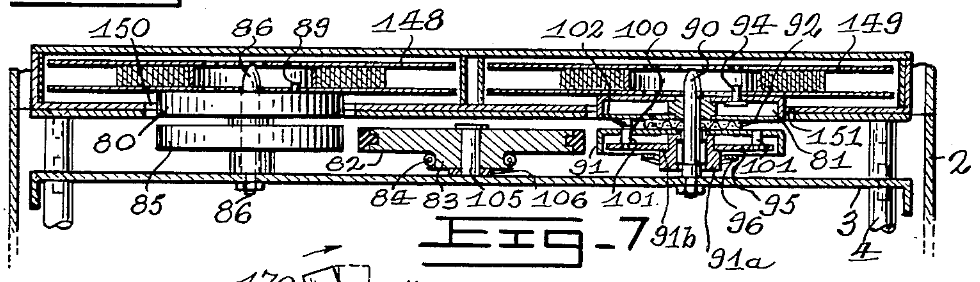
Fig. 7 is a sectional view taken along the lines 7—7 of Fig. 5, but with the details in the lower compartment of the cabinet omitted.

The turntable 81 is mounted for free rotation on a centering pin 90 carried by table 3, with the free end of centering pin 90 projecting beyond the upper surface of the turntable for centering a second tape reel thereon. A drum 91 is mounted for rotation about pin 90 below the turntable 81. Drum 91 carries a friction pad 92 upon which turntable 81 rests for light frictional engagement. Turntable 81 will rotate with drum 91 when other frictional forces do not upset the light frictional engagement between pad 92 and the turntable. A spring plate 93 is secured to the inner surface of the upper side of turntable 81 and is provided with a locking pin 94 which projects through a hole in the turntable for locking engagement with a reel when mounted on turntable 81. A plate 95 is arranged about the hub 91*a* of disc 91 (see Figs. 3 and 7). This plate is normally supported by a shoulder 91*b* of the hub. One arm 96 of a lever 97 which is hingedly connected at 98 to table 3 is arranged below plate 95 so that the other arm 99, when actuated, will cause arm 96 to raise and lower plate 95. As shown in Figs. 7 and 8, drum 91 is provided with three radially arranged holes 100 through which complementary pins 101 on the upper side of plate 95 are projected when the plate is raised to cause said plate to rotate with the drum. The underside of turntable 81 is provided with a downwardly projecting pin 102 which is arranged in the path of rotation of pins 101 when the plate 95 is in its raised position. The nearest pin 101 of the plate is brought to bear against pin 102 to provide positive rotation of the turntable with the drum.

Figs. 4 and 7 illustrate how friction driving wheel 82 and pulley 83 are mounted on a common axis pin 105 carried by one arm 106 of a crank lever 107 which is pivotally mounted on a pin 108 carried by table 3. As will be seen more clearly in Figs. 9, 10 and 11, the other arm 109 of the lever, which is at right angles to arm 106, is provided with a pin 110 which projects upwardly through an elongated slot 111 extending transversely of a lever actuating arm 112 overlying lever arm 109 and pivotally connected at one end to pin 108. Arm 112 has a post 113 mounted thereon, by means of which the arm is rotated. A pair of resilient pressure plates 115 are mounted on a post 116 carried by actuating arm 112. Plates 115 extend laterally from post 116 with their free ends disposed on either side of pin 110. The rotating friction driving wheel 82 is selectively brought to bear against the drums 85 and 91 by the rotation of actuating arm 112. When the actuating arm 112 is rotated in either direction about its pivotal axis 108, one of the resilient pressure plates 115 bears against pin 110 to rotate lever 107 in the same direction about the common pivotal axis 108. Slot 111 and pressure plates 115 afford a resilient movement to the lever 107 which provides a cushioning effect when contact is made between the driving wheel 82 and either of the drums 85 or 91. Rotation of arm 112 in a clockwise direction moves friction driving wheel 82 into contact with drum 91 and causes said drum to rotate in a counter-clockwise direction. Counter-clockwise rotation of arm 112 moves the friction driving wheel into contact with drum 85 and imparts a counter-clockwise rotation thereto.

Figures 9, 10, 11:
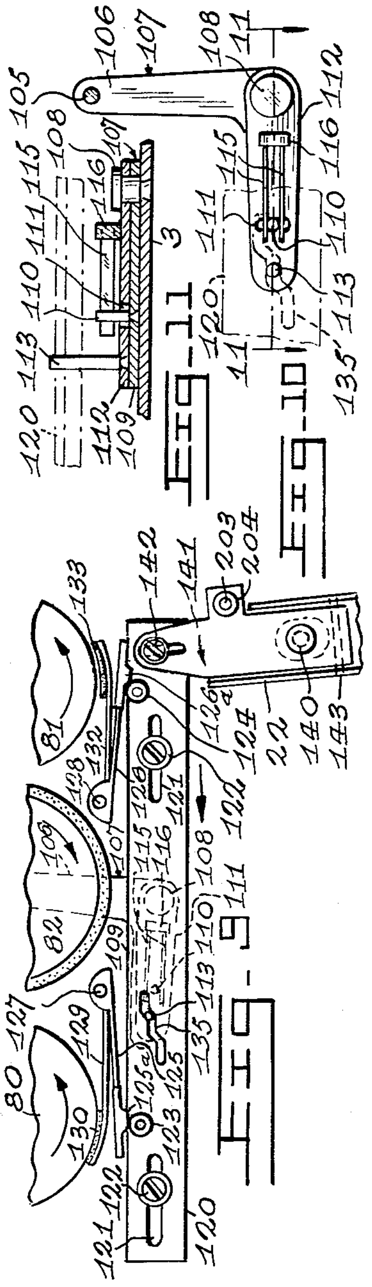
Fig. 9 is an enlarged view, partly broken away, of the brake and friction driving wheel actuating mechanisms shown in Fig. 4.
Fig. 10 is a detail view of the friction driving wheel actuating mechanism shown in Fig. 9.
Fig. 11 is a sectional view taken along the lines 11—11 of Fig. 10.

In Figs. 4 and 9 I have illustrated a novel braking mechanism for the turntables 80 and 81. A transverse bar 120 provided with slots 121 is mounted on posts 122 which project through said slots for lateral slidable shifting movement of the bar. Cam riding wheels 123 and 124 are rotatably mounted on bar 120 adjacent one side edge thereof to engage cam levers 125 and 126 respectively. Cam levers 125 and 126 are each pivotally mounted on table 3 at 127 and 128. A flexible brake arm 129 has one end fastened to the pivotal end of cam lever 125 and is disposed in side-by-side relation to lever 125 with its free end curved away from the free end of the lever. A brake shoe 130 on the free end of brake arm 129 is adapted to bear against the turntable 80. A spring 131 fastened at one end to table 3 and at the other end to cam lever 125 normally tends to hold the cam lever 125 against cam riding wheel 123. Lever 125 has a cam bearing projection 125*a* which is flat on its outer edge and bevelled on its flanking side edges. Similarly a flexible brake arm 132 has one end fastened to the pivotal end of cam lever 126 and is disposed in side by side relation to lever 126 with its free end curved away from the free end of the brake lever. A brake shoe 133 on the free end of brake arm 132 is adapted to bear against turntable 81. A spring 134, fastened at one end to table 3 and at the other end to cam lever 126, normally tends to hold the cam lever 126 against cam riding wheel 124. The lever 126 is provided with cam bearing projection 126*a* which is flat on its outer edge and bevelled on its flanking side edges.

Bar 120 is provided with a cam slot 135 in which the post 113 of lever actuating arm 112 is guided for rotation of the friction driving wheel lever 107 when bar 120 is shifted.

When the friction driving wheel is in its neutral position, cam riding wheels 123 and 124 are bearing against the flat outer edges of cam projections 125*a* and 126*a* respectively causing full brake pressure of the shoes 130 and 133 against the turntable drums 85 and 91 respectively. To rotate the turntable 81 bar 120 is shifted to the left, as illustrated in Fig. 9. The right hand offset path of cam 135 causes post 113 to rotate arm 112 which in turn rotates lever 107 in a clockwise direction, bringing friction wheel 82 into resilient contact pressure with turntable drum 91 to rotate same in a counter-clockwise direction. During the initial shifting movement wheel 124 rides down the inner bevelled slope of projection 126*a*, gradually releasing the braking pressure on turntable 81. At the same time wheel 123 travels across the flat outer surface of cam projection 125*a*, maintaining the braking pressure on turntable 80. As the brake is being released on turntable 81 the friction wheel 82 is being brought into increasing contact pressure with drum 91. While the pressure contact is being increased between friction wheel 82 and drum 91 the cam bearing wheel 123 is riding down the outer bevelled surface of cam projection 125*a* to thereby release the braking pressure on turntable 80. Bar 120 is reversely shifted to centre position causing post 113 to ride in the reverse direction in the right hand offset of cam slot 135. Post 113 causes lever 107 to be rotated counter-clockwise to return the friction driving wheel to neutral. In the initial reverse shifting stage braking pressure is first lightly applied to turntable 80 by the cam wheel 123 riding up the outer bevelled surface of cam projection 125*a* before the contact is broken between friction wheel 82 and turntable 81. As the contact pressure of wheel 82 on drum 91 is diminishing cam wheel 124 rides up the inner bevelled surface of cam projection 126*a* to apply increasing braking pressure to turntable 81.

The reverse of the above procedure is followed to rotate turntable 80. Bar 120 is shifted to the right causing post 113 to rotate lever actuating arm 112 through the medium of the left hand offset path of cam 135. Arm 112 rotates lever 107 in a counter-clockwise direction to move friction driving wheel 82 into resilient contact pressure with the turntable drum 85 to rotate same in a counter-clockwise direction. Braking pressure is first released on turntable 80 followed by the releasing of braking pressure on turntable 81 as the contact pressure between wheel 82 and drum 85 is made more positive. Return of the friction driving wheel 82 to neutral is effected by reversely shifting bar 120 to the centre position which causes lever 107 to be rotated clockwise through the medium of arm 112 which is actuated by post 113 in cam slot 135. During this operation braking pressure is first applied to turntable 81 and then to turntable 80.

The bar 120 is laterally shifted by lever arm 22 which is mounted for lateral rotation at a point intermediate its length about a vertical axis 140 carried by table 3. Arm 22 having its outer end projecting forwardly through vertical slot 17 in the panel board 12 is provided with an extension arm 141 having its outer end pivotally connected at 142 to bar 120. The inner end of extension arm 141 overlies the inner end of arm 22 and is arranged about the vertical axis 140 for lateral rotation only. Arm 22 and extension arm 141 are fastened together forwardly of the vertical axis 140 by a transverse pin 143 which permits rotation of arm 22 about a horizontal axis. The rear end of arm 22 overlies the free end of the arm 99 of lever 97. When arm 22 is raised in vertical slot 17 it depresses arm 99 to raise plate 95 through the arm 96 so that the pins 101 are projected through holes 102 in drum 91. A cover plate 144 is arranged over the brake and friction wheel mechanism and is provided with openings 144*a* and 144*b* through which turntables 80 and 81 project.

The cartridge assembly 8 is removably mountable over the turntables 80 and 81. The assembly 8 is housed in a casing 145 having a cover 146 hinged to said casing at 147. A pair of tape reels 148 and 149 are arranged in the casing over openings 150 and 151 in the bottom of the casing. Reels 148 and 149 are retained in position by retaining walls 152 and 153, or other suitable means, arranged about the outer periphery of the reels so that when the assembly is mounted over the turntables the central openings 154 and 155 of the reels will receive the centering pins 86 and 90 of the turntables 80 and 81. Reels 148 and 149 are brought to bear against turntables 80 and 81 which project through openings 150 and 151 in the bottom of casing 145 with the placement of the casing on cover plate 144. Turntable locking pins 89 and 94 engage in one of the radially arranged holes 156 and 157 respectively of said reels.

Figure 13:
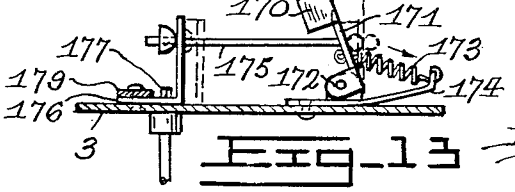
Fig. 13 is a view along the section line 13—13 of Fig. 4 showing details of the magnetic eraser and its operating mechanism.
Figure 5:
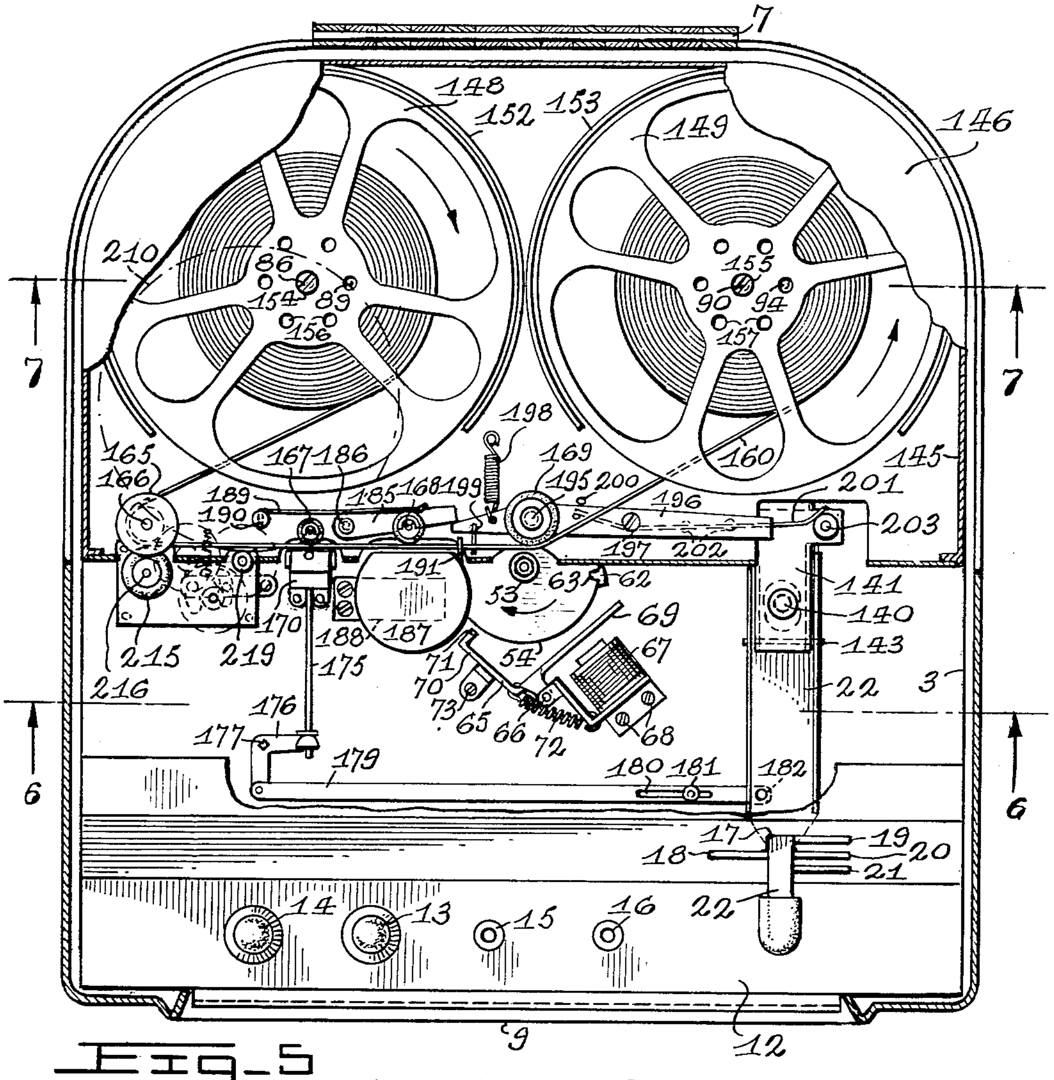
Fig. 5 is a view similar to Fig. 4, but with the cartridge assembly in place. Certain parts are broken away for clarity.

A recording tape 160, which is originally wound round reel 148, is trained around a pulley 165 mounted on a vertical axis pin 166 carried by casing 145, in front of two spaced apart resiliently padded posts 167 and 168 and then around a pressure pulley 169, with the free end of the tape secured to the reel 149. Post 167 is directly mounted on the casing 145 and is positioned opposite to a magnetic eraser 170 with the tape therebetween. Magnetic eraser 170 is mounted on an arm 171 to swing about a horizontal axis 172 carried by table 3. The eraser 170 is shown canted away from the tape in its inoperable position (see Figs. 4, 5 and 13). A spring 173 anchored at one end to a plate 174 carried by table 3 has the other end secured to arm 171 for biasing the eraser to its vertical position shown in dotted lines in Fig. 13. In the vertical position the eraser bears against tape 169, pressing the tape against post 167. The magnetic eraser is rotated against the biasing of spring 173 by a rod 175 loosely connected at one end to arm 171 and at the other end to a crank arm 176 which is pivotally mounted on a vertical axis pin 177 carried by table 3. A record listening switch 178 is connected to the lower end of pin 177 and is actuated by the rotation of crank arm 176 when the eraser is moved out of contact with the tape. The other end of crank arm 176 is connected to a second rod 179 which is provided with a slot 180. A supporting post 181 carried by table 3 extends through slot 180 to support the rod 179 for lateral shifting movement. A pin 182 on the free end of rod 171 is adapted to be projected through a complementary opening 183 in arm 22. The arrangement of rods 175 and 179 and crank arm 176 is such that when the eraser has been rotated to its inoperative position it will remain in that position notwithstanding the biasing of spring 173 which tends to cause the eraser to return to its vertical operating position. When rod 179 is shifted to the right by the rotation of lever arm 22 in a counter-clockwise direction, crank arm 176 is rotated and releases its restraining pressure on the adjacent end of rod 175 so that the biasing spring 173 rotates the eraser 170 about its pivotal axis 172 to its operating position.

Resiliently padded post 168 is mounted on an arm 185 intermediate the length of the arm. Arm 185 is mounted at one end to rotate about a vertical axis pin 186 carried by the base of casing 145. A recording head 187 is suitably mounted on a bracket 188 which is fixed to table 3. The recording head is positioned opposite to post 168 with the tape passing therebetween. A spring plate 189, having one end secured at 190 to casing 145, bears against post 168 to bring the tape into contact with the recording head. The head is provided with a projection 191 which is arranged over the upper edge of the tape to insure that the recording surface of the tape is positioned directly in front of the recording head.

Pressure pulley 169 is mounted in front of capstan 53, with the tape therebetween, to rotate about a vertical axis pin 195 carried by a lever arm 196 at a point intermediate one end and the lever arm pivotal axis 197 carried by the base of casing 145. The end of lever arm 196 beyond pulley 169 engages the free end of post arm 185 to rotate arm 185 against the biasing of spring plate 189 so as to move post 168 out of pressure contact with the tape when the apparatus is not recording. A spring 198 having one end anchored to casing 145 and the other end secured to the end of lever arm 196 beyond the pulley normally tends to rotate said arm in a clockwise direction about its pivotal axis 197 to move the pulley 169 away from the capstan 53 and to rotate arm 185 against its biasing spring 189. A finger 199 projecting from the end of lever arm 196 and having its free end upturned pulls the tape away from the recording head when lever arm 196 is rotated by spring 198. A post 200 mounted on casing 145 limits the rotation of the lever arm.

The other end of lever arm 196 is provided with a flexible member 201 secured at 202 with its free end projecting beyond the end of the lever arm. A post 203 mounted on lever arm 22 is adapted to bear against the projecting end of member 201 to rotate lever arm 196 in a counter-clockwise direction about its pivotal axis 197 to bring pressure pulley 169 into engagement with capstan 53. This action permits the post 168 to impart its pressure to the tape against the recording head. Post 203 is fixed to lever arm 22 for vertical movement through an opening in the lever arm extension 141 and in a guide member 204 mounted on extension 141 to ensure vertical positioning of post 203 at all times. When the outer end of lever arm 22 is in the intermediate or lowered positions in slot 17 of panel 12, the post 203 will project above the upper surface of member 204 and rotation of lever arm 22 in a counter-clockwise direction causes the projecting end of post 203 to bear against the flexible projection 201 of the lever arm 196 to rotate same. When lever arm 22 is raised above the intermediate position on panel board 12, post 203 drops below the surface of member 204 out of contact with the flexible projection 201 of lever arm 196. A light spring 205 is arranged about post 203 between lever arm 22 and its extension 141 normally retains the outer end of arm 22 in a neutral position in vertical slot 17 and in alignment with the right hand horizontal slot 20. The arm 22 must be raised in slot 17 to enter the horizontal slot 19 or depressed against spring 205 to enter slot 21.

In the operation of the magnetic sound recorder the switch is turned on through knob 14 to energize motor 39 which rotates capstan 53 and the turntable friction driving wheel 82 in a clockwise direction. When it is desired to record on the tape, lever arm 22 is depressed in slot 17 from the neutral position and is rotated counter-clockwise to the recording position in the lower right hand slot 21. Bar 120 is shifted left to rotate the friction driving wheel lever mechanism clockwise bringing driving wheel 82 into resilient contact pressure with turntable drum 91 to rotate same in a counter-clockwise direction. The shifting of the bar also releases first the brake 133 on turntable 81 followed by the releasing of brake 130 on turntable 80. This allows any slack to be taken up between the reels 148 and 149. At the same time post 203 pressing against the flexible projection 201 rotates lever arm 196 in a counter-clockwise direction bringing the pressure pulley 169 to bear against the rotating capstan 53 with the tape therebetween and allowing pressure post 168 to press the tape against the magnet head 187. As the arm 22 is depressed, pin 182 of the eraser actuating rod 179 is received in a hole in the arm provided therefor. The rotation of arm 22 into slot 21 causes rod 179 to rotate crank arm 176 counter-clockwise, which, in turn, releases its restraining pressure on rod 175 and allows the magnetic eraser 170 to be moved to its vertical operating position against the tape. In the recording position both the magnetic eraser and head are energized.

Although friction driving wheel 82 normally tends to drive the drum 91 at a comparatively high rate of speed, the tape from reel 148 is fed between capstan 53 and pressure pulley 169 by the rotation of the capstan at a constant, slow rate of speed which is regulated to suit the recording on the tape. The light frictional engagement between turntable 81 and drum 91 allows slipping so that the tape is only wound on reel 149 as it is fed through the capstan and pressure pulley.

If it is desired to interrupt the recording without switching off the remainder of the mechanism, the magnet 67 is energized by suitable outside means, for example, a press button, to trip the lever 65. Lever 65 engages the clutch plate 54 of the capstan and disengages the capstan clutch from the rotating motor driven driving wheel 39 in the manner hereinbefore described. When the magnet is de-energized, lever 65 is withdrawn from engagement with the clutch plate 54 permitting the capstan to engage the motor driven mechanism to rotate therewith, in the manner previously described, and the feeding of the tape is again set in motion.

To reverse or rewind the tape, the lever arm 22 is first moved to its neutral position de-energizing the magnetic eraser and head and moving the eraser to its inoperative position by rotation of crank arm 176 in a clockwise direction. At the same time the driving wheel 82 and lever arm 196 are rotated to their neutral positions and the brakes are applied first to turntable 80 and then to turntable 81 to take up the slack in the tape between the reels. Lever arm 22 is then rotated to the left in slot 18 shifting bar 120 to the right, to rotate driving wheel lever mechanism counter-clockwise and to release the brakes first on turntable 80 and then on turntable 81. Since there is a positive connection between drum 85 and turntable 80 the tape will be rewound on reel 148 at a high speed. It will be noted that, during this operation, finger 199 on lever arm 196 holds the tape away from the magnetic head and capstan 53.

When it is desired to play back the recording on the tape, lever arm 22 is rotated counter-clockwise into the intermediate right hand slot 20. The mechanism functions the same as for recording except that the magnetic head is arranged to play back the recording and the magnetic eraser is held in its inoperable position.

It is sometimes desirable to pass from one portion of the recording on the tape to another without the necessity of playing back the intervening portion. This may be accomplished by shifting lever arm 22 to neutral and then raising it in the vertical slot 17 until it can be rotated counter-clockwise in the upper right hand slot 19. In this manner bar 120 performs the same functions as for recording, but post 203 being dropped below the surface of member 204, does not actuate lever arm 196 so that the tape is held away from the magnetic head and the capstan. Similarly the magnetic eraser is retained in its inoperable position. The raising of lever arm 22 depresses the arm 99 of lever 97 to raise the plate 95 through the medium of arm 96. The pins 101 projecting through openings 100 in drum 91, engage pin 102 of turntable 81 to give a positive high speed drive to the turntable. When the point in the reproduction of the recording has been reached the lever arm 22 is returned to neutral and thence to the playing back position.

The tape feeding from reel 148 to reel 149 is measured on a disc 210 which is arranged beneath the cover 146 of casing 145 to rotate about an axis pin 211 carried by the cover. One complete revolution of disc 210 represents the length of the tape and the measurements are marked on the upper surface of the disc to be viewed through an aperture 212 in cover 146 of the casing as well as through a second aperture 213 in the cover 6 of the cabinet. The feeding of the tape is measured through a pressure wheel 215 mounted on an axis pin 216 carried by a supporting plate 217. Pressure wheel 215 bearing against the tape as it passes around pulley 165 is rotated and, through a series of reduction gears, indicated at 218, rotates a second pressure wheel 219 mounted on axis pin 220 carried by plate 217. Pressure wheel 219 bears against the peripheral edge of disc 210 to rotate the same. Plate 217 is pivotally mounted on the free end of an arm 221 by an axis pin 222 which has a bearing member 223 arranged for movement in an elongated slot 224 in table 3. The other end of arm 221 is mounted for rotation on table 3 about a pivotal axis 225. A pin 226 on arm 221 projects upwardly through an elongated slot 277 in plate 217 to limit the rotation of plate 217 relative to arm 221. A spring 228 anchored to table 3 at one end and to arm 221 at its other end, tends to rotate arm 221 so that both the wheels 215 and 219 will be in constant pressure engagement with the tape on pulley 165 and the measuring disc 10 respectively.

I claim:

1. In a magnetic sound recorder having winding and rewinding turntables adapted to receive the reels of a magnetic recording tape which is fed from one reel to the other, means mounting said turntables for rotation therewith, a lever mounted for rotation about a pivotal axis, a motor driven friction driving wheel mounted for rotation on said lever intermediate the winding and rewinding turntables, an actuating arm rotatable about said lever pivotal axis, said wheel being movable into direct engagement with both of said turntable mounting means, means continuously resiliently engaging said arm with said lever during rotation of said lever for smooth rotation of the lever about its pivotal axis to selectively move said friction driving wheel into and out of resilient frictional rotary engagement directly with one or the other of the turntable mounting means as said actuating arm is rotated, and further means operable for rotation of said actuating arm about its pivotal axis, said last mentioned means comprising, a bar member mounted for translational movement relative to said arm, and means connecting said actuating arm and bar member whereby translational movement of said bar member causes rotation of said actuating arm.

2. In a magnetic sound recorder having winding and rewinding turntables adapted to receive the reels of a magnetic recording tape which is fed from one reel to the other, means mounting said turntables for rotation therewith, a crank lever mounted for rotation about a pivotal axis, a motor driven friction driving wheel mounted for rotation on one arm of said crank lever intermediate the winding and rewinding turntables, an actuating arm arranged to overlie the other arm of said crank lever and having one end mounted to rotate about the pivotal axis of said crank lever and provided at its free end with a transversely extending slot, an arm engaging pin carried by said last mentioned crank lever arm to ride in said slot, flexible means mounted to resiliently engage said pin when the actuating arm is rotated to rotate said crank lever for moving said friction driving wheel into frictional rotary engagement with one or the other of said turntable mounting means, and a further means operable to rotate said actuating arm.

3. A magnetic sound recorder, as set forth in claim 2, in which said flexible means comprises a pair of resilient pressure plates mounted at one end on said actuating arm and extending laterally with their free ends disposed on either side of the arm engaging pin.

4. A magnetic sound recorder as set forth in claim 2, in which said last mentioned means includes a bar mounted over said actuating arm and slidable relative to the actuating arm for movement in opposite directions, said bar having a cam slot, and a post member carried by said actuating arm and riding in the cam slot for rotation of said actuating arm when the bar is shifted in either direction.

5. In a magnetic sound recorder, the combination of a winding turntable, a rewinding turntable, rotatable means mounting said turntables in spaced relation to each other and for rotation with said rotatable means, a reel mounted for rotation on each of said turntables, a recording tape connected to said reels to be fed from one to the other by rotation of said reels, a magnetic recording head mounted adjacent the length of tape between said reels for recording on the tape, a capstan mounted adjacent the said length of tape, means actuating said capstan for predetermined constant speed rotation, a power driven rotary friction wheel mounted intermediate said turntables, friction wheel mounting means supported on a vertical axis for swinging said friction wheel to selectively engage each turntable mounting means to selectively rotate said turntables in the same direction, braking members mounted for separately engaging said turntables, a transverse bar mounted for lateral sliding movement in opposite directions, said bar cooperatively engaging said braking members and said friction wheel mounting means to rotate said last mentioned means and to selectively actuate each braking member at predetermined intervals to control the tape feed from one reel to the other during the swinging movement of the friction wheel into and out of engagement with one or other of the rotary turntable mounting means, a pressure pulley engageable with one side surface of the tape, a lever arm supporting said pulley and swingable about a vertical pivotal axis to move said pulley into pressure engagement with the tape to thereby press the tape against said capstan for regulating the feed of the tape in the winding direction to a speed consistent with the predetermined speed of rotation of the capstan, a second pressure means biased for pressing said tape against said magnetic head and operable in response to movement of said lever arm to effect pressure engagement of said tape with said magnetic head, and a second lever arm mounted intermediate its length for lateral rotation in opposite directions about a vertical axis, said second lever arm having one end connected to said transverse bar for lateral sliding movement of said bar in opposite directions in response to lateral rotation of said second lever arm, and means carried by said second lever arm for actuating rotary movement of said first lever arm about its pivotal axis to bring said pulley into said pressure engagement with the tape during movement of said transverse bar in a direction which translates rotation of said winding turntable.

6. In a magnetic sound recorder, the combination of a pair of winding and rewinding turntables adapted to receive the reels of a magnetic recording tape which is fed from one reel to the other, a driving wheel mounted between said turntables, means mounting said wheel for moving said wheel to selectively engage said turntables for rotation of same, a braking mechanism mounted for engaging each turntable, and a control member mounted for lateral sliding movement relative to said wheel mounting means and said braking mechanisms, said control member being slidable in opposite directions to cooperatively engage said wheel mounting means and said braking mechanisms for actuating said driving wheel and braking mechanisms to selectively control the winding and rewinding turntables at predetermined intervals when the driving wheel is moved into and out of engagement therewith, to maintain tension on the tape between the reels.

7. In a magnetic sound recorder having spaced winding and rewinding turntables mounted on vertical axes and adapted to receive the reels of a magnetic recording tape which is fed from one reel to the other, a magnetic recording head mounted at one side of the length of tape between reels, a rotary capstan mounted on a vertical axis at the same side of the length of tape between said reels, a pressure pulley engageable with the other side surface of said length of tape, a lever arm pivotally mounted intermediate its length about a vertical axis, said pressure pulley being mounted on the lever arm at one side of its vertical axis, a spring member engaging said lever arm on the same side of its vertical axis as the pulley mounting, said spring member resiliently biasing said lever arm for rotation of said arm about its pivotal axis to move the pressure pulley out of engagement with the capstan, a finger carried by said lever arm on said one side of its vertical axis, said finger having a part thereof disposed on said one side of said tape adapted to move said tape away from said recording head when said spring member rotates said lever arm, a flexible member mounted on said lever arm at the other side of said vertical axis, and actuating means movable for engagement with said flexible member for yieldingly rotating said arm about its pivotal axis against the resilient biasing member to move the pressure pulley into engagement with the capstan with the tape therebetween to feed the tape past the magnetic head at a constant rate of speed which is synchronized with the sound recording and reproducing.

8. In a magnetic sound recorder the combination of spaced apart winding and rewinding turntables adapted to receive the reels of a magnetic recording tape which is fed from one reel to the other past a magnetic head mounted for recording sounds on said tape, said winding turntable being superimposed on a rotary disc about a common axis, a friction pad interposed between the turntable and disc, said pad normally providing light frictional contact between the turntable and disc during the tape winding operation, means mounted for frictionally engaging the disc to rotate same in the winding direction to cause said winding turntable to rotate through the light frictional contact therewith, a plate mounted beneath the disc in spaced relation thereto and movable vertically relative to said disc, said disc being provided with openings in its upper surface, turntable engaging pins mounted on said plate below the surface of said disc and aligned to project through the openings in the disc, and a further pin carried by the turntable and projecting downwardly therefrom into the path of rotation of the pins carried by said plate when the latter pins are projected through the openings of said disc, and means operable for raising said plate relative to the disc to project said plate pins through the disc openings and into the path of said turntable pin when it is desired to provide positive rotation of said turntable in the winding direction.

9. A magnetic sound recorder including a housing, a pair of turntables mounted in said housing for rotation about separate vertical axes, a magnetic head secured to said housing for recording on a recording tape, a power driven capstan mounted in said housing for rotation about a vertical axis, and a cartridge assembly removably mounted on said housing over said turntables and at one side of said magnetic head and capstan, said cartridge assembly including a base plate, a pair of reels carried by said base plate and positioned thereon to be operably fitted on the turntables for rotation therewith when the assembly is mounted over said turntables, a recording tape trained about said reels for feeding from one reel to the other by rotation of said turntables, and cooperative means carried by said base plate to prealign the tape extending between said reels on the cartridge assembly for automatic positioning of said tape adjacent the working surface of said magnetic head and said capstan as the assembly is mounted on said housing, said means being operable to train the tape extending between said reels into recording engagement with the magnetic head and into pressure contact with the capstan, said capstan being operable to control the feed of the tape past the magnetic head at a constant rate of speed which is synchronized with the recording.

10. A magnetic recorder, as set forth in claim 9, in which said last mentioned means includes a lever arm mounted for rotation on said base plate about a vertical axis intermediate the length of said arm, a pressure pulley mounted on said lever arm on one side of the pivotal axis of said arm, said pressure pulley engaging the tape and being adapted to hold the tape in pressure contact with the rotary capstan when the lever arm is rotated to move said pressure pulley toward the capstan, and means mounted on said housing to engage said lever arm on the other side of its pivotal axis for rotating said lever arm about its pivotal axis.

11. A magnetic sound recorder, as set forth in claim 10, including a pressure post pivotally mounted on said base plate for pressure engagement of the tape against the magnetic head, said post being normally biased to pressure engagement with the head and means carried by the lever arm for moving said post out of pressure engagement with the head against the resistance of the post biasing means.

12. A magnetic sound recorder, as set forth in claim 9, including means mounted for lineal measurement of the tape as it is fed from one reel to the other, said means including a rotary indicator mounted on said base plate and having lineal readings thereon, a wheel adapted to be rotated by the moving tape, a second wheel adapted to rotate said indicator, a gear reduction mechanism actuated by said first wheel to rotate the second wheel and a stabilizer supporting said first and second wheel, said stabilizer being mounted on said housing for pivotal movement to bring said first and second wheels into pressure contact with the tape and indicator respectively.

13. In a magnetic sound recorder the combination of spaced winding and rewinding turntables mounted for rotation about vertical axes and adapted to receive the reels of a magnetic recording tape which is fed from one reel to the other, a magnetic head mounted for recording on said tape, a rotary capstan, driving means mounting said capstan for rotation about a vertical axis for feeding the tape past the magnetic head, a clutch mechanism carried by the capstan and engageable with said driving means, said clutch mechanism including a clutch plate fixed to rotate with said capstan at the base thereof, a clutch member pivotally connected for eccentric rotation to the underside of the clutch plate, an inwardly projecting lug on said clutch member normally engaging the driving means to rotate said capstan, means normally biasing said clutch member to rotate said member for engaging the driving means, an outwardly projecting member on said clutch member normally extending beyond the outer edge of the clutch plate when the clutch mechanism is engaging the driving means, said clutch plate being provided with a notch at the outer edge thereof and said clutch actuating mechanism comprising a lever arm pivotally mounted for movement into and out of contact with the clutch plate for rotating said clutch member by its outwardly projecting member to disengage the clutch mechanism with the driving means, said lever arm engaging in the clutch plate notch to stop rotation of the capstan relative to the driving means when the clutch member has been rotated out of contact with the driving means, and further means operable to rotate said lever arm.

14. In a magnetic sound recorder, the combination of a pair of winding and rewinding turntables adapted to receive the reels of a magnetic recording tape which is fed from one reel to the other, a driving wheel mounted between said turntables, means mounting said wheel for moving same to selectively engage said turntables for rotation of the turntables, brake mechanisms separately mounted for releasably engaging each turntable, each of said brake mechanisms including a brake actuating cam lever, a control member mounted for lateral sliding movement relative to said wheel mounting means and said brake mechanisms, said control member being slidable in opposite directions to engage said wheel mounting means for moving said driving wheel to selectively operate each turntable, and means mounted on said control member and adapted to engage said cam levers for actuating said brake mechanisms to control the winding and rewinding turntables at predetermined intervals when the driving wheel is moved into and out of engagement therewith, to maintain tension on the tape between reels.

15. A magnetic sound recorder as set forth in claim 14, in which each of said brake mechanism cam levers is pivotally mounted at one end to swing about a vertical axis, and at least one of said brake mechanisms includes a flexible brake arm having one end fastened to the pivotal end of one cam lever and rotatable therewith, a brake shoe on the free end of said brake arm adapted to bear against the adjacent turntable, means normally biasing said one cam lever against the cam lever engaging means of said control member to thereby swing said brake shoe arm away from said turntable, and a cam bearing projection on the free end of said one cam lever, said projection having a predetermined bearing surface contour over which said cam lever engaging means is moved during sliding movement of said control member, to rotate said one cam lever against the biasing of same for the application and release of braking pressure between the braking mechanism and the turntable, said application and release being predetermined by the bearing surface contour of said cam bearing projection.

16. In a magnetic sound recorder having spaced winding and rewinding turntables mounted on vertical axes and adapted to receive the reels of a magnetic recording tape which is fed from one reel to the other, a magnetic recording head mounted at one side of the length of tape between reels, a rotary capstan mounted on a vertical axis at the same side of the length of tape between said reels, a pressure pulley engageable with the other side surface of said length of tape, a lever arm pivotally mounted intermediate its length about a vertical axis, said pressure pulley being mounted on the lever arm at one side of its vertical axis, a spring member biasing said lever arm for rotation of said arm about its pivotal axis to move the pressure pulley out of engagement with the capstan and actuating means movable for engagement with said lever arm at the other side of its vertical axis for rotating said arm about its pivotal axis against the resilient biasing member to move the pressure pulley into engagement with the capstan with the tape therebetween to feed the tape past the magnetic head at a constant rate of speed which is synchronized with the sound recording and reproducing, an arm member mounted at one end to rotate about an independent vertical axis, a resilient pressure post carried by said arm member intermediate its length, said arm member being normally biased to bring the pressure post into engagement with the magnetic head with the tape therebetween, said pressure pulley lever arm arranged to engage the free end of the pressure post arm to move the pressure post out of engagement with the head when the pressure pulley is rotatably moved away from said capstan.

17. A magnetic sound recorder as set forth in claim 1 including a motor rotatably driving said friction driving wheel, a capstan engaging said tape and being rotatably driven by said motor to feed said tape from one reel to the other at a predetermined speed, and a clutch operable to release the drive between said motor and capstan independently of the driving connection between said motor and friction driving wheel.

18. A magnetic sound recorder as set forth in claim 1 including a motor rotatably driving said friction driving wheel, a capstan engaging said tape and being rotatably driven by said motor to feed said tape from one reel to the other at a predetermined speed, a clutch operable to release the drive connection between said motor and capstan independently of the driving connection between said motor and friction driving wheel, and electromagnetic means to operate said clutch.

References Cited in the file of this patent

UNITED STATES PATENTS

| | | |
|---|---|---|
| 2,438,222 | Lear | Mar. 23, 1948 |
| 2,555,643 | Harrison | June 5, 1951 |